United States Patent Office 3,071,457
Patented Jan. 1, 1963

3,071,457
PROCESS OF APPLYING SEA SOLIDS AS FERTILIZER
Maynard R. Murray, 227 Kilpatrick St., Wilmette, Ill.
No Drawing. Filed June 3, 1958, Ser. No. 739,463
2 Claims. (Cl. 71—1)

This invention relates to the process of applying sea solids as a fertilizer. By sea solids we mean the inorganic salts that are dissolved in the water; the term as it will be used in the specification hereinafter and in the claims does not include living organisms, plant or animal, but means merely the salts that are dissolved, which will include the salts of the various elements mentioned in this application.

This invention relates more particularly to the use of sea solids in certain proportions for different crop requirements.

This invention further contemplates the use as a fertilizer of complete sea solids mixed with nitrogenous compounds, the proportions of each and the total amount of fertilizer depending upon the type of crop which it is desired to raise and the condition of the soil.

As is well known to those who have made a study of the problem, soil loses its fertility in several ways, the most important being as follows:

(1) Removing food products from the soil and not replacing the elements that are taken away to market;

(2) Wind and water erosion—due primarily to improper coverage of the soil. Rain, for all practical purposes, is distilled water—which is nature's best solvent. If rain is allowed to escape rapidly from the soil, it carries with it many dissolved and suspended elements.

(3) Poor methods of agriculture, especially in crop rotation, etc.

A census taken in 1935 by the Department of Agriculture showed that 61% of the total cropland—about 253,000,000 acres—was subject to continued erosion and would not give the farmer a satisfactory return on his invested time, and that 57,200,000 acres of land had by then been destroyed for tillage. In 1938, it was estimated by the U.S. Department of Agriculture that on 12% of the total land area, erosion had removed more than three-quarters of the original surface soil; on 37% of the land, about one-quarter of the original surface soil had been lost.

Steps are being taken by the Agriculture Department, as well as by private agencies, to thwart this menace; however, it is still a gigantic problem which seems to be far from solved. Increasing the organic content of the soil, and water control by building dams and improving waterways, is doing much to preserve the land that is left. Reforestation and proper coverage crops can and are doing a great deal to control wind erosion. Millions of tons of artificial fertilizer are being used to replace some of the major elements lost by erosion and continuous cultivation.

In recent years, there has been a great amount of study and actually some effort to bring back to the soil some of the micro-elements as well as the major elements. Agronomists have shown many instances where plant diseases due to virus, fungi and even bacteria, may be caused by a deficiency in the soil of one or more elements. In other cases, there are instances of where the plant, even though seemingly healthy, is deficient in elements and gives rise to diseases in animals. One of the first to recognize this was Chatin, who in 1851 observed that the iodine content in the soil was lower in areas where goitre was more prevalent.

*Iodine.*—Von Fellenberg, in 1924, reported that the soil at Effingham, Switzerland, a goitre-free area, contained 11.9 p.p.m. of iodine, while the soil at Hunzenschwill, where 56.2% of the population suffered from goitre, contained only .62 p.p.m. of iodine. Since this important work, it has been shown that the incidence of goitre is almost inversely proportional to the amount of iodine in the soil from which the various populations derive most of their food.

*Copper.*—In 1928, Hart and others showed that copper was essential for the synthesis of the hemoglobin in animals. It has been shown that a deficiency of copper in the soil is responsible for not only primary anemia, but several other diseases of domesticated animals. It has also been shown that copper deficiency in the soil is responsible for numerous plant diseases or deficiency symptoms.

*Zinc.*—Hove, in 1937, definitely showed that zinc was an essential element for normal nutrition in rats. Keilin and Mann, in 1940, showed that zinc was essential for certain enzymatic reactions, especially that of carbonic anhydrase in animal tissue. Zinc is also thought to have something to do with sterility in cows, as shown by Mussill in 1941. Small amounts of zinc are necessary for the normal growth of plants and various fungi. As is true with microelements, an excess of this element is toxic.

*Iron.*—Iron has been extensively studied and found to be an essential element in the cytochrome system of plants and in the hemoglobin formation of animals. A lack of this element causes chlorosis in plants and anemia in animals.

*Cobalt.*—Cobalt was shown to have a relationship to anemia in animals by Underwood and Filmer in 1935. It had been known previously in 1804 by James Hogg that sheep with salt lick disease were improved when changed to another pasture. Within the past decade there has been much work done in human nutrition and cobalt, and especially has this been true since it was shown that cobalt is an essential part of the vitamin B–12 molecule.

*Manganese.*—Manganese was shown to be an essential element in the synthesis of chlorophyll in plants by McHargue in 1924 and by Bertrand and Rosenblatt in 1932. A deficiency of this element has been shown to be responsible for numerous plant diseases. It has also been shown to be essential for proper growth and reproduction of animals by Johnson in 1943. Such diseases as perosis in chickens has been shown to be caused by a deficiency of manganese in their diet.

*Fluorine.*—Maercher, in 1908, was among the first to refer to the effect of fluorine on bone formation. Of recent years, many investigators have contributed voluminously to literature pertaining to the relationship of fluorine and dental structures. It has been rather conclusively shown that an optimum amount of fluorine must ingested for the proper resistance of teeth to decay, and if this amount is raised significantly, there seems to be a deleterious effect.

*Boron.*—In 1915, Maze showed that boron was essential for the growth of maize, but injurious in excess. Since that time, many investigators have shown it to be essential for numerous plants, and a deficiency of it has been shown to produce various diversified plant diseases. The effect of boron deficiency in animal life has not been thoroughly investigated; however, there have been recent reports in the literature pertaining to boron toxicity from the use of boric acid dressing, etc.

*Molybdenum.*—Molybdenum has been shown to be of utmost importance in the fixation of nitrogen by Azotobacter. In 1936, Burke and Horner showed that molybdenum in the concentration of one part in 50 million in nutrient solution increases the fixation of nitrogen as much as 100-fold. It is essential for the growth of various fungi, and in fact the growth of these fungi is used as a quantitative test for this element. In recent years, it has been shown that molybdenum is essential, as are copper, iron and cobalt, for the production of hemoglobin in animals. In fact, at least one drug company has put out molybdenum combined with iron as a therapeutic drug for the treatment of anemia.

The effects of other trace elements, such as antimony, arsenic, lead, selenium and tin have been studied, especially from the standpoint of their toxicity. Even though traces of these elements are found in animal tissue, their physiology, if any, is not understood.

From the foregoing, it appears quite clear that deficiencies in elements or unbalanced amounts of elements are reflected in food plants. Animals, we know, are dependent upon such plants for life, and man is dependent upon both. Thus is can be concluded step by step along the cycle of life that the diet may have a pronounced effect upon health and disease in man.

Since plant life depends upon the soil in which it is grown for any or all of the elements above mentioned and others, my process has for an object the restoration into the soil of all of said elements and others, all of which are contained in sea solids or its mixture with nitrogenous compounds.

We know that elements—like energy, can neither be created nor destroyed. They can only be moved from one place to another. When one thinks fundamentally of the problem of erosion, however, he wonders where the elements eventually go after they leave the soil. If one has stood on the banks of the Mississippi River and watched the turbidity of the water, it becomes apparent that much of the soil is being dissolved or suspended and washed into the ocean.

Realizing this gigantic loss of elements into the sea by erosion, an experiment was undertaken some fourteen years ago to determine what effect the application of six elements taken from the sea would have on plant growth. It was shown that the addition of one or more elements to the soil created innumerable problems, especially those of blocking. The effect of one element blocking another had previously been studied and is still under investigation. Many men have contributed to this field and have shown not only that elements block each other, but that they have different blocking effects under different circumstances. This is noticeable especially when the pH of the soil is varied. An excellent chart was compiled by the V.P.I. Agricultural Extension Service of Blacksburg, Virginia, in 1953, showing the effect of pH on the availability of the many elements.

When one is confronted with so many variables, to obtain a plant raised under optimum conditions seems to be almost impossible. It was therefore decided by the author to obtain the elements from sea water in the proportion that they occur there. The most soluble salts found in the land should be found in the most abundant supply in the sea. Sodium chloride is found in a much greater concentration in the sea than are the various barium salts. It is known that sodium chloride per se, in great concentrations, is toxic to plants. Therefore it was deemed advisable to start with very low concentrations of sea water to test their effect on plants. This was done in pot and plot experiments, and it was found, after considerable experimentation, that sea solids comprising 3½% of sea water could be applied to the soil in fairly great concentrations, without detriment to the plants. The solids were obtained by evaporating the $H_2O$ completely and leaving the elements in solid salt form. The optimum amount found for most grain and vegetable plants grown in the temperate zone of the United States was from 550 to 2200 pounds per acre. This salt was applied by means of an International Harvester lime spreader at a rate of 550 to 2200 pounds per acre. The salt is first ground in a burr mill before spreading. The hydroscopic nature of the salt required that it be stirred from time to time as it was being applied to insure accurate spreading.

Oats, soy beans, grain and many varieties of garden vegetables were grown on soil thus treated. In 1954, one-quarter of an acre of garden vegetables were grown; ten acres of treated and control corn have been grown; ten acres of treated oats along with ten acres of control oats were grown; also three acres of treated soy beans and three acres of control soy beans have been grown.

In my experiments to date, I have studied, or am in the process of studying, various phases:

First, animals were fed a diet of four parts of corn; two parts of oats, and one part of soy beans, all grown on land treated with sea solids. This was to determine the effect of these grains grown on soil with all the elements found in the sea on normal physiology and pathology. The rats fed on the control, or untreated corn, oats, and soy beans, developed xeraphthaemia in 12 to 14 days. The rats fed on the experimental feed did not show eye changes.

Three hundred chickens were obtained from a local hatchery when one day old. They were divided into two groups of 150 each. All were fed the commercial concentrate, plus four parts of corn and two parts of oats. The animals fed on the experimental corn and oats matured approximately one month in advance of the control. The experimental started to lay eggs three to four weeks earlier, and the eggs weighed two to three ounces more per dozen in the experimental flock. Dressed experimental roosters at six months of age weighed 1½ pounds more than the control, and there was less food consumed per pound by weight gain in the experimental chickens. There was a decided difference in the skeletal structures of the experimental and control chickens, as shown by X-ray.

Second, productivity. In oats, there was no manifest difference in productivity; however, during the growing stage, just before the oats headed, there was a marked difference in color. The experimental lot was darker green, which was noticeable to the eye and is also readily distinguishable in colored photographs. The farmer who harvested this crop observed that the experimental plot had many more rabbits, suggesting a taste difference. There was also an observable difference in the amount of "rust"—being much more prevalent in the control plot. The ash weight showed a 1.1% increase in the experimental. The second generation oats showed excellent germination and production, although no further applications of sea solids were put on the soil. Second generation oats were essentially "rust" free.

In corn grown in 1952, the treated plot yielded 19.6 bushels more per acre than the control. This, however, might be an incorrect interpretation, as the treated plot seemed to be retarded in its maturity about ten days. The season was unusually dry, and we had a rainfall at a critical time, which I felt was in time to help the treated plot, but not the control. In 1954, the experimental plot of corn yielded about 13 bushels more per acre than the control, and the experimental showed an increase of 1.7% in ash weight.

The control soy beans yielded 8.87 bushels more per acre than the experimental soy beans; however, the experimental showed an increase of 14.6% in ash weight. Second generation experimental soy beans grew larger and the production was slightly higher than the control. There was also a 5.6% increase in ash weight in the experimental, although no further applications of sea solids were made.

The increase in ash weight of the experimental garden vegetables over the control was as follows: Sweet potatoes 8.3%; onions 4.4%; tomatoes 18.7%.

Third, diseases in plants. There was a marked difference between the treated and control plants in "curly leaf" of peach trees, the treated tree being much freer of the disease. In blight of tomatoes, the treated plants showed a marked difference in resistance to the disease. The most phenomenal difference in plant diseases noted was in corn smut, which showed 384% more smut in the control plot than in the experimental. These figures are based upon the number of observable galls counted on 4.9 acres in each plot. Not only were the galls much less numerous in the experimental, but they appeared smaller, and fewer were on the ears. These same results were repeated on the second generation corn without further application of sea solids to the soil.

It is known that there are many acres of soil unfit for the growth of garden peas. This is said to be due to an infection of the root of the plant caused by Aphanomyces and Fusaria, the former being very specific for the pea plant, and the latter having the ability to attach other hosts. In greenhouse experiments, I was able to grow the pea plant to maturity in soil infected with these two organisms, with the addition of sea solids, using two different varieties of peas. The control plants died at or before the blooming stage.

"Center rot" in turnips is said to be due to a staphylococcus infection. In 100 plants on treated and control soil, there was an incidence of center rot in 30 of the control, and none in the experimental.

Fourth, it was also decided to test the effect of sea solids on the pH of the soil. The ordinary garden beet was used as an indicator plant. In acid soil, this plant is supposed to germinate and put forth two leaves which seemingly are healthy. The second pair of leaves, however, usually die and the plant will not grow to maturity if the soil is too acid. I obtained soil from La Porte County in Indiana with a pH of 4. After the addition of my sea solids, I found that the pH decreased slightly, but later returned to its original value. I planted beets and radishes in this soil treated with sea solids and was able to grow them to maturity. I feel that so-called sour soil is deficient, and most probably not deficient in calcium alone; that the pH itself is not the determining factor as to whether or not the ordinary varieties of plants found in this climate will grow. Radishes were grown in treated soil with a pH of 4. Beets, a sour soil indicator plant, grew beyond the third and fourth leaf.

*Observations.*—A number of observations made during these experiments have been recorded for their possible significance. Sheep ignored a field of untreated hay to get to a ten foot square patch of treated hay, indicating a taste difference. Also, experimental stalks of corn were marked with tape, and mixed with control corn. Cattle and sheep would nuzzle through the corn to pick out the experimental stalks, again indicating a taste difference. The farmer who harvested the oats noticed that the experimental oats attracted more rabbits and grasshoppers. A taste differecne was also noted in garden vegetables. Onions and radishes were sweeter than the control vegetables. There was also a difference in the taste of lettuce, green beans and carrots. In apples and grapes, vitamin A and vitamin C were found in greater quantity in the experimental crop. The experimental grapes were higher in sugar content. Further research is being done at the present time on several crops. Iowa State University is doing research on oats. Research on other small grains is being run by Purdue University. Soy bean experiments are being run at the Agriculture Experiment Station at Peoria, Illinois. Corn and chicken feeding experiments are being done at the University of Illinois.

*Summary.*—The list of elements found to be important in the normal development and health of plants and animals has increased steadily over the years. The problem has been made even more complex by the discovery that the availability of an element to the plant may be dependent upon the presence or absence of other elements in the soil. The experiments of this report are based on three hypotheses. They are:

(1) That *all* of the elements may be important in plant and animal physiology.

(2) That the elements should be added to the soil in the exact proportion and balance as they are found in sea water, including the sodium chloride. This is based on the assumption that the solubility of an element determines its rate of leaching from the soil, and the amount of it found in sea water.

(3) That most animals need to have the inorganic elements hooked up by plants for proper utilization.

Tolerance experiments indicated that the amount of complete sea solids (including sodium chloride) that could be added to mid-western and eastern soils ranged from 550 to 2200 pounds per acre.

As a specific illustration of the use of sea solids as a fertilizer, an experiment was conducted in recent months on tomatoes, with the following results:

| | Vitamin C, mg./100 gram on whole tomato | Percent moisture | Vitamin C, mg./100 gram on solids |
|---|---|---|---|
| Control (no sea solids fertilizer) | 7.60 | 95.5 | 169 |
| #1, 550 lb. sea solids per acre | 8.46 | 95.0 | 170 |
| #2, 1,100 lb. sea solids per acre | 14.20 | 94.2 | 245 |
| #3, 2,200 lb. sea solids per acre | 11.60 | 94.0 | 193 |

It will thus be notd that 1100 lbs. per acre of the fertilizer is about the proper amount for the best growth of tomatoes.

Complete sea solids are obtained by drying sea water obtained from any ocean to complete dryness. The end product contains all elements soluble in water or saline solution, as found in sea water. Forty-four of these elements are listed in a chart in N. A. Lange's Handbook of Chemistry, Handbook Publishers, Inc., Sandusky, Ohio, 1946. This table shows the proportion of these elements (expressed in parts per million) as they occur in sea water of 19% chlorinity.

To one ton of these sea solids, ground in a burr mill, I have added:

80 to 800 lbs. of ammonium nitrate pellets or crystals; or
100 to 1100 lbs. of ammonium sulphate; or
50 to 400 lbs. of urea.

The range of these nitrogenous compounds is accounted for by the fact that different crops require different amounts of nitrogen in proportion to sea solids. Tolerance experiments with this mixed fertilizer have indicated that from 550 to 2200 pounds per acre can be used on field crops, fruits and vegetables.

I have varied the above process in the following ways: I have used sea *water* with the same proportion of elements described above, mixed with proportional amounts of nitrogenous compounds. Also, I have applied the sea solids to the land first, and then applied the nitrogenous compound afterward.

As hereinbefore described, crops grown on soil fertilized with the above-described fertilizer have been analyzed for ash weight, vitamins and elements; and production has been noted. The results indicate an increase in ash weight, vitamins, number and proportion of elements, yield and resistance to plant disease. Animals have been fed products grown on fertilized soil with a stimulus in growth and improvement in bone and tissue structure. Thus it can be seen that the beneficial results of controlled use of sea solids or sea solids mixed with nitrogenous compounds are readily apparent. From experiments described herein, it is apparent that equally beneficial results will be obtained by the controlled use of sea solids in the growth of other grains, vegetables and fruits.

In this discussion I have used the range of 550 to 2200 pounds per acre as applied to mid-western or eastern soils. Also, the crop to be raised on the land determines the amount to be used. It will be noted that 2200 pounds per acre increased the production of corn, made no difference in production of oats, and decreased the production of soy beans. Therefore, soy beans should have no more than 1100 pounds per acre. Garden vegetables that were outlined in the discussion above had 2200 pounds, all with the same production as untreated vegetables.

When 550 pounds are applied, I apply that amount each year for four years. The amount of 2200 pounds, when applied at once, and 550 pounds, when applied each year for a period of four years, will last, on soil with ordinary drainage, for a period of five years. I analyze the soil for a heavy element, a medium weight element and a light element, to see when sea solids should be applied again.

From the above and foregoing description it can be seen that from my experiments I have discovered the beneficial uses of sea solids as a fertilizer, especially when applied in controlled amounts and for the production of specific crops; also the beneficial results obtained by an admixture of sea solids and nitrogenous compounds.

What I claim is:

1. A method of fertilizing soil which comprises applying to the soil as a fertilizer complete sea solids obtained by total evaporation of sea water to remove substantially completely all the water contained therein, wherein said sea solids contain essentially the total weight content of each of the inorganic elements originally present as dissolved solids in the sea water evaporated including the original quantity of sodium chloride contained therein, each of said elements being present in said sea solids in substantially the same proportion and balance as said elements are found in sea water.

2. A method of fertilizing soil which comprises applying to the soil as a fertilizer the product obtained by the process of drying sea water to remove a substantial proportion of the water therefrom, wherein said product contains essentially the total weight content of each of the inorganic elements originally present as dissolved solids in the sea water dried including the original quantity of sodium chloride contained therein, each of said elements being present in said product in substantially the same proportion and balance as said elements are found in sea water.

References Cited in the file of this patent

UNITED STATES PATENTS

| | | |
|---|---|---|
| 285,555 | Beck et al. | Sept. 25, 1883 |
| 1,178,119 | Allen | Apr. 4, 1916 |
| 2,207,470 | Weber | July 9, 1940 |
| 2,404,550 | Thomsen | July 23, 1946 |
| 2,589,289 | Ryan | Mar. 18, 1952 |
| 2,606,839 | Evans | Aug. 12, 1952 |
| 2,687,339 | Dancy et al. | Aug. 24, 1954 |
| 2,713,749 | Hult | July 26, 1955 |
| 2,934,419 | Cook | Apr. 26, 1960 |

FOREIGN PATENTS

| | | |
|---|---|---|
| 84 of 1852 | Great Britain | Oct. 1, 1852 |
| 19,706 of 1910 | Great Britain | Jan. 12, 1911 |

OTHER REFERENCES

Collins G. H.: "Commercial Fertilizers," 5th ed., McGraw-Hill Book Co. Inc., N.Y., 1955, pages 74 and 100–103.

Collins, S. H.: "Chemical Fertilizers and Parasiticides," Bailliere, Tindall and Cox, London, 1920, pp. 41–43.

Collings G. H.: Commercial Fertilizers, Their Sources and Use, Fourth Edition, published by the Blakiston Co., Philadelphia, page 235.

Bruttini, A.: Uses of Waste Material, published by P. S. King & Son, Ltd., London, 1923, pages 207 to 217.